(12) United States Patent
Merzhaeuser et al.

(10) Patent No.: US 10,830,207 B2
(45) Date of Patent: Nov. 10, 2020

(54) SPAR CONFIGURATION FOR JOINTED WIND TURBINE ROTOR BLADES

(71) Applicant: General Electric Company, Schenectady, NY (US)

(72) Inventors: Thomas Merzhaeuser, Munich (DE); Mathilde Aubrion, Kolding (DK); Rishikesh Kumar, Bangalore (IN); Soeren Steffensen, Brabrand (DK)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 16/114,341

(22) Filed: Aug. 28, 2018

(65) Prior Publication Data

US 2020/0072189 A1  Mar. 5, 2020

(51) Int. Cl.
*F03D 1/06* (2006.01)
*F03D 80/30* (2016.01)

(52) U.S. Cl.
CPC .......... *F03D 1/0683* (2013.01); *F03D 80/30* (2016.05); *F05B 2240/302* (2013.01); *F05B 2280/2001* (2013.01); *F05B 2280/2006* (2013.01); *F05B 2280/6003* (2013.01)

(58) Field of Classification Search
CPC ...... F03D 1/0675; F03D 1/0683; F03D 80/30; F05B 2240/302
See application file for complete search history.

(56) References Cited

U.S. PATENT DOCUMENTS

| 851,196 A | 4/1907 | Bevans et al. |
| 4,474,536 A | 10/1984 | Gougeon et al. |
| 4,643,646 A | 2/1987 | Hahn et al. |
| 4,732,542 A | 3/1988 | Hahn et al. |
| 5,281,454 A | 1/1994 | Hanson |
| 7,334,989 B2 | 2/2008 | Arelt |
| 7,344,360 B2 | 3/2008 | Wetzel |
| 7,521,105 B2 | 4/2009 | Bech et al. |

(Continued)

FOREIGN PATENT DOCUMENTS

| EP | 2186622 A1 | 5/2010 |
| EP | 3144526 A1 | 3/2017 |

(Continued)

OTHER PUBLICATIONS

International Search Report, dated Nov. 20, 2019.

*Primary Examiner* — Michael Lebentritt
*Assistant Examiner* — Topaz L. Elliott
(74) *Attorney, Agent, or Firm* — Dority & Manning, P.A.

(57) ABSTRACT

A jointed wind turbine rotor blade includes a first blade segment and a second blade segment extending in opposite directions from a chord-wise joint. A beam structure extends span-wise from the first blade segment into a receiving section formed in the second blade segment. The receiving section includes opposite spar caps and opposite interconnecting webs. The spar caps have a constant thickness along the receiving section where the spar caps overlap with the beam structure and are formed of a material or combination of materials along the receiving section to produce a desired stiffness of the spar caps along the receiving section. The webs have a reduced amount of conductive material adjacent to a chord-wise joint between the blade segments.

17 Claims, 6 Drawing Sheets

(56) References Cited

U.S. PATENT DOCUMENTS

| | | | |
|---|---|---|---|
| 7,901,188 B2 | 3/2011 | Llorente Gonzalez et al. | |
| 7,922,454 B1* | 4/2011 | Riddell | F03D 13/10 416/224 |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2* | 1/2013 | Bech | B29C 66/9121 416/229 R |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,562,296 B2* | 10/2013 | Arocena De La Rua | F03D 80/30 416/146 R |
| 8,721,829 B2* | 5/2014 | Jacobsen | B29C 70/30 156/250 |
| 8,777,578 B2* | 7/2014 | Hancock | B29C 66/1162 416/226 |
| 8,777,579 B2* | 7/2014 | Hancock | B25B 11/02 416/233 |
| 8,828,172 B2* | 9/2014 | Overgaard | B29C 70/34 156/245 |
| 8,899,936 B2* | 12/2014 | Hancock | B29C 66/116 416/226 |
| 10,563,636 B2* | 2/2020 | Yarbrough | F03D 1/0675 |
| 2005/0180854 A1 | 8/2005 | Gmbau et al. | |
| 2007/0018049 A1 | 1/2007 | Stuhr | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0215494 A1 | 8/2010 | Bech et al. | |
| 2010/0272570 A1* | 10/2010 | Arocena De La Rua | F03D 80/30 416/146 R |
| 2010/0304170 A1 | 12/2010 | Frederiksen | |
| 2011/0052403 A1* | 3/2011 | Kawasetsu | F03D 1/0675 416/226 |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0171032 A1* | 7/2011 | Hancock | B25B 11/02 416/223 R |
| 2011/0189025 A1* | 8/2011 | Hancock | B29C 66/547 416/226 |
| 2011/0229336 A1 | 9/2011 | Richter et al. | |
| 2011/0262283 A1* | 10/2011 | Hancock | B29C 66/1162 416/226 |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0068389 A1* | 3/2013 | Overgaard | B29C 70/34 156/324 |
| 2013/0129518 A1 | 5/2013 | Hayden et al. | |
| 2013/0164133 A1 | 6/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1* | 8/2013 | Busbey | F03D 1/0633 416/223 R |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0204200 A1 | 7/2015 | Eyb et al. | |
| 2015/0369211 A1 | 12/2015 | Merzhaeuser | |
| 2018/0051672 A1* | 2/2018 | Merzhaeuser | F03D 13/10 |
| 2019/0032632 A1* | 1/2019 | Danielsen | F03D 80/50 |
| 2020/0147912 A1* | 5/2020 | Thomsen | F03D 1/0675 |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

SPAR CONFIGURATION FOR JOINTED WIND TURBINE ROTOR BLADES

FIELD

The present subject matter relates generally to wind turbine rotor blades and, more particularly, to a spar configuration between segments of a jointed blade.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In recent years, wind turbines for wind power generation have increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a beam structure extending lengthways that structurally connects with a second blade segment at a receiving section. The beam structure forms a portion of the internal support structure for the blade and includes a shear web connected with a suction side spar cap and a pressure side spar cap. Multiple bolt joints are on the beam structure for connecting with the receiving end of the second blade segment, as well as multiple bolt joints located at the chord-wise joint between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections. The spar bridge may be an extension of one of the spar sections that is received in a receiving spar section of the other blade portion. As the extending spar section may be received in the receiving spar section, the extending spar caps and the receiving spar caps may overlap each other along at least a part of the length of the extending spar section. To limit the material thickness of the overlapping spar caps, the references describes that the thickness of the receiving spar caps may be tapered down towards the joint, i.e. along at least a part of the length of the receiving spar section.

It has been found that a critical structural consideration in such jointed blades is how to keep the joint elements/receiving structures strongly connected or bonded the blade shell, particularly at the exposed area of joint line between the blade segments. The stress at this location is driven by the stiffness of the web reinforcements in conjunction with the stiffness of the shell. In addition, the conductive carbon materials used in the joint elements at the exposed joint lines are more susceptible to lightning strikes.

Therefore, an improved joint structure between the blade segments of a jointed blade that addresses the issues noted would be an advantageous advancement in the art.

BRIEF DESCRIPTION

Aspects and advantages of the invention will be set forth in part in the following description, or may be obvious from the description, or may be learned through practice of the invention.

In one aspect, the present disclosure is directed to a jointed wind turbine rotor blade that includes a first blade segment and a second blade segment extending in opposite directions from a chord-wise joint. Each of the blade segments has a pressure side shell member and a suction side shell member. An internal spar structure runs span-wise through the blade segments and includes a beam structure that extends span-wise from the first blade segment. This beam structure may be an integral extension of the spar structure within the first blade segment, or may be a separate structure that is fixed to the spar structure in the first blade segment. A receiving section is formed in the second blade segment for receipt of the beam structure and includes opposite spar caps and opposite interconnecting webs. In one embodiment, this receiving section is formed as a box-beam structure within the second blade segment into which the beam structure slides, and which may be a section of the internal spar structure formed within the second blade segment.

In a particular embodiment, the spar caps in the receiving section have a constant thickness along the receiving section where the spar caps overlap with the beam structure to produce a desired stiffness of the spar caps along the receiving section. The spar caps are formed from a material or combination of materials along the receiving section that may further contribute to the desired stiffness characteristic.

In a certain embodiment, the receiving section spar caps may be formed from a single material along the receiving section, which may be a high-strength conductive material such as a carbon fiber material, or a non-conductive material, such as a glass fiber material.

In an alternate embodiment, the receiving section spar caps may be formed from a combination of materials along the receiving section, including a non-conductive material at a terminal end thereof at the chord-wise joint. For example, the entirety of the constant thickness of the spar caps at the chord-wise joint may be defined by the non-conductive material, wherein such non-conductive material extends span-wise away from the chord-wise joint for a defined length. A transition may be defined between the non-conductive material and a different material, such as a higher-strength conductive material (e.g., a carbon material) along the receiving section that maintains the constant thickness along the receiving section. For example, the transition may include tapering overlapping sections of a carbon conductive material and the non-conductive material.

In addition to the spar caps having the constant thickness, the webs (e.g., shear webs) along the receiving section may be formed entirely of a high strength conductive material, such as a carbon fiber material, but include a reduced amount of such material at the chord-wise joint line as compared to a defined distance from the chord-wise joint line. This configuration serves to decrease the amount of conductive material exposed to potential lightning strikes at the joint line. For example, in one embodiment, the webs may include a cutout region adjacent the chord-wise joint line. This cutout region may be, for example, a curved, semi-circular, or straight-sided (e.g., triangular) region that removes at least a portion of the conductive material from the webs adjacent to the joint line.

In an alternate embodiment that reduces the amount of conductive material at the joint line, the interconnecting webs may have a tapering thickness of the carbon material approaching the chord-wise joint line. The interconnecting webs may also taper towards the chord-wise joint line regardless of their material make-up.

In still another embodiment, the interconnecting webs may include a transition from the carbon material to a non-conductive material at a distance from the chord-wise joint line such that the non-conductive material is at the joint line.

In other aspects, the present disclosure is drawn to a jointed wind turbine rotor blade that includes a first blade segment and a second blade segment extending in opposite directions from a chord-wise joint. Each of the blade segments has a pressure side shell member and a suction side shell member. An internal spar structure runs span-wise through the blade segments and includes a beam structure that extends span-wise from the first blade segment. This beam structure may be an integral extension of the spar structure within the first blade segment, or may be a separate structure that is fixed to the spar structure in the first blade segment. A receiving section is formed in the second blade segment for receipt of the beam structure and includes opposite spar caps and opposite interconnecting webs. In one embodiment, this receiving section is formed as a box-beam structure within the second blade segment into which the beam structure slides, and which may be a section of the internal spar structure formed within the second blade segment. The spar caps in the receiving section are formed of a non-conductive material at a terminal end thereof at the chord-wise joint, wherein the non-conductive material reduces the risk of a lightning strike to the spar caps at the joint line. In this embodiment, the entirety of the spar caps at the chord-wise joint may be defined by the non-conductive material, wherein the non-conductive material extends span-wise away from the chord-wise joint for a defined length. A transition may be defined between the non-conductive and a higher-strength conductive material (e.g., a carbon fiber material) along the receiving section. This transition may taper overlapping sections of the conductive material and the non-conductive material.

In yet another aspect, the present disclosure is drawn to a jointed wind turbine rotor blade that includes a first blade segment and a second blade segment extending in opposite directions from a chord-wise joint. Each of the blade segments has a pressure side shell member and a suction side shell member. An internal spar structure runs span-wise through the blade segments and includes a beam structure that extends span-wise from the first blade segment. This beam structure may be an integral extension of the spar structure within the first blade segment, or may be a separate structure that is fixed to the spar structure in the first blade segment. A receiving section is formed in the second blade segment for receipt of the beam structure and includes opposite spar caps and opposite interconnecting webs. In one embodiment, this receiving section is formed as a box-beam structure within the second blade segment into which the beam structure slides, and which may be a section of the internal spar structure formed within the second blade segment. The interconnecting webs are formed at least in part from a high-strength conductive material (e.g., a carbon fiber material) but have a reduced amount of such conductive material at the chord-wise joint line as compared to a defined distance from the chord-wise joint line. For example, the interconnecting webs may include a cutout region adjacent the chord-wise joint line, or a tapering thickness of the conductive material approaching the chord-wise joint line.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
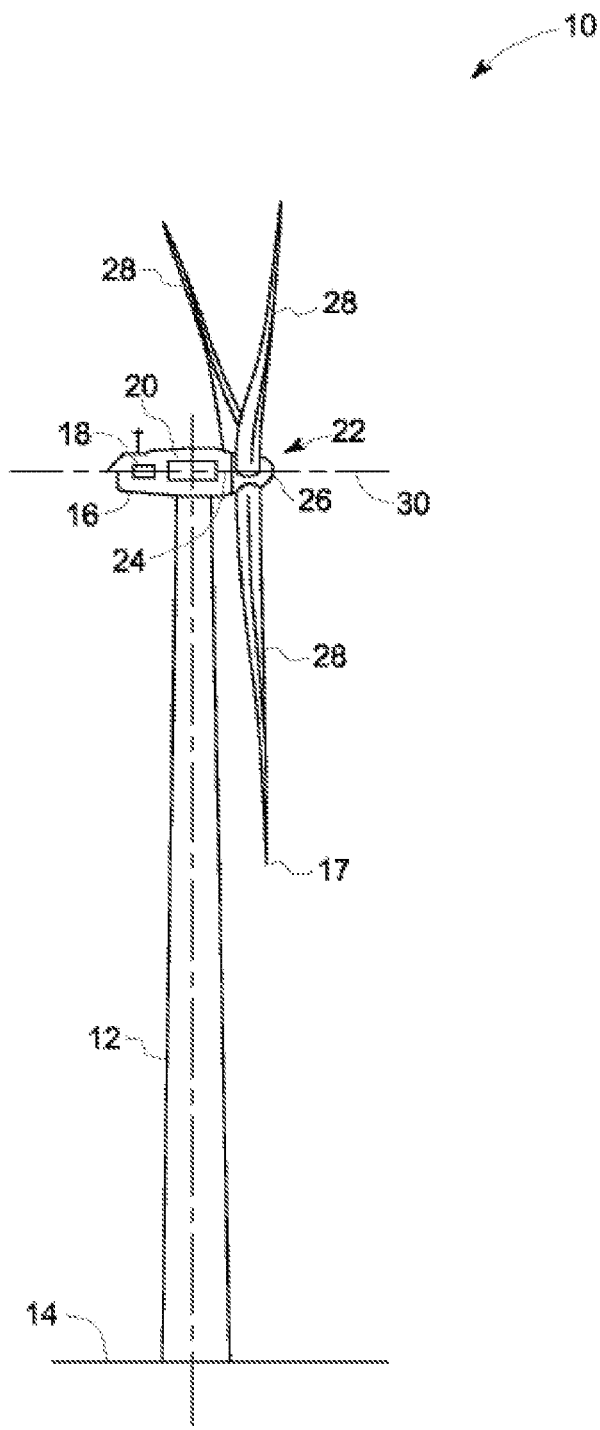
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to jointed wind turbine rotor blades having an improved joint configuration that serves to keep the joint elements/receiving structures strongly connected or bonded the blade shell, particularly at the exposed area of joint line between the blade segments where the stresses are generally dictated by the stiffness of the web reinforcements in conjunction with the stiffness of the shell. In addition, in certain embodiments, the joint configuration reduces the use of conductive carbon materials at the exposed joint lines to minimize lightning strikes to the blade at the joint.

Referring now to the drawings, FIG. 1 is a side view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 includes a blade tip 17 to a blade root 19.

Figure 2:
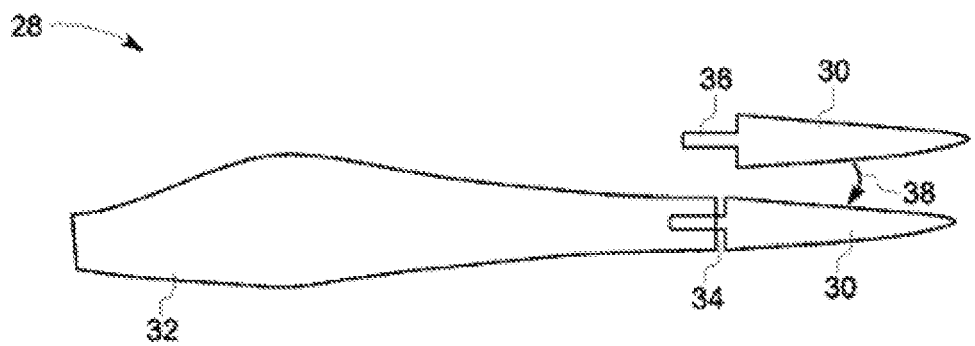
FIG. 2 illustrates a rotor blade having a first blade segment and a second blade segment in accordance with the present disclosure.

FIG. 2 is a plan view of a jointed rotor blade 28 having a first blade segment 30 and a second blade segment 32 in accordance with aspects of the present technology. The first blade segment 30 and the second blade segment 32 extend in opposite directions from a chord-wise joint 34. Each of the blade segments 30, 32 includes a pressure side shell member 31 and a suction side shell member 33. The first blade segment 30 and the second blade segment 32 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 20, 32 are joined by inserting the internal support structure 36 into the second blade segment 32.

Figure 3:
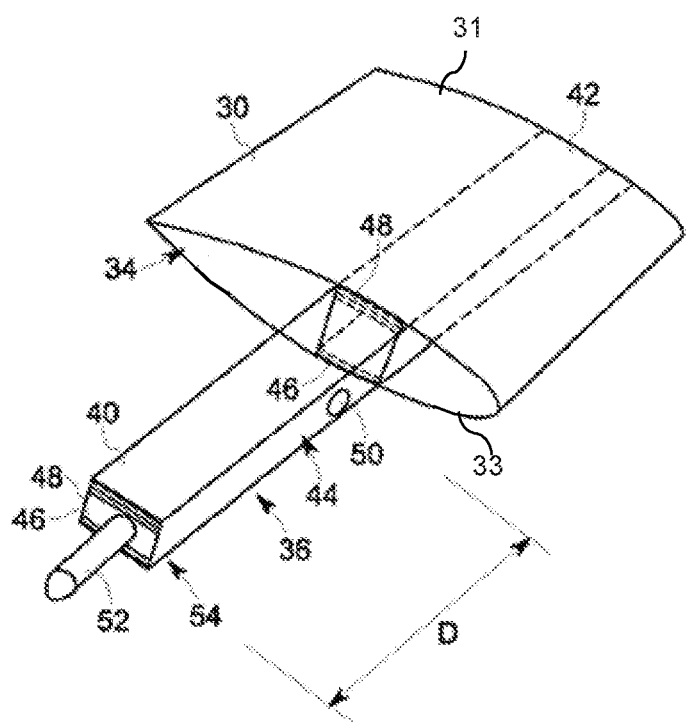
FIG. 3 is a perspective view of an embodiment of a first blade segment.

FIG. 3 is a perspective view of an example of a section of the first blade segment 30 in accordance with the present technology. The first blade segment 30 includes a beam structure 40 that forms a portion of the internal support structure 36 and extends lengthways (e.g., span-wise) for structurally connecting with the second blade segment 32. The beam structure 40 may be integrally formed with the first blade segment 30 as an extension protruding from a spar section 42, thereby forming an extending spar section. The beam structure 40 includes at least one interconnecting web 44 (e.g., a shear web) connected with a suction side spar cap 46 and a pressure side spar cap 48. In the illustrated embodiments, the beam structure is formed as a box-type structure having opposite interconnecting webs 44.

The first blade segment 30 may include one or more first bolt joints towards a first end 54 of the beam structure 40. For example, a bolt tube 52 may be located on the end 54 of the beam structure 40 and oriented in a span-wise direction. The first blade segment 30 may also include a bolt joint slot 50 located on the beam structure 40 proximate to the chord-wise joint 34 and oriented in a chord-wise direction. There may be a bushing within the bolt joint slot 50 arranged in a tight interference fit with a bolt tube or pin used to connect the second blade segment 32 to first blade segment 30. It should be appreciated that any combination of bolt tubes 52 and bolt slots 50 may be configured between the beam structure 40 and a receiving section 60 (FIG. 4) for the purpose of interconnecting the first 30 and second 32 blade segments.

Figure 4:
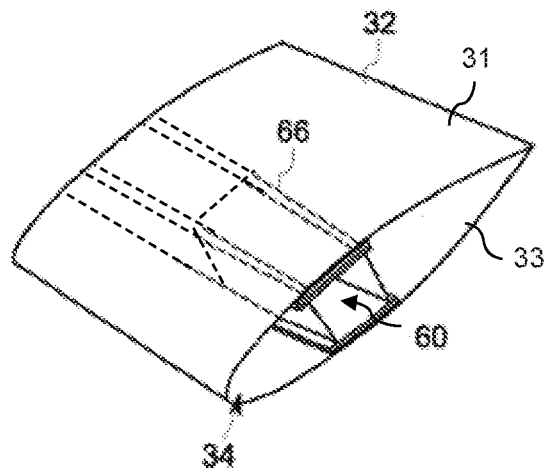
FIG. 4 is a perspective view of an embodiment of a second blade segment.

FIG. 4 is a perspective view of a section of the second blade segment 32 at the chord-wise joint 34 in accordance with an example of the present technology. The second blade segment 32 has a receiving section 60 extending lengthways (span-wise) within the second blade segment 32 for receiving the beam structure 40 of the first blade segment 30. The receiving section 60 includes multiple spar structures 66 that extend lengthways for connecting with the beam structure 40 of the first blade segment 30 along a length 76 (FIG. 5) of the receiving section 60. Although not depicted in FIG. 4, it is readily understood that the receiving section 60 includes any combination of bolt slots or bolts for interconnecting with the bolts and bolt slots of the beam structure 40. For example, a bolt slot is configured in a distal end (away from the chord-wise joint 34) of the receiving section 60 for receipt of the bolt 52 provided on the end 54 of the beam structure 40.

Figure 5:
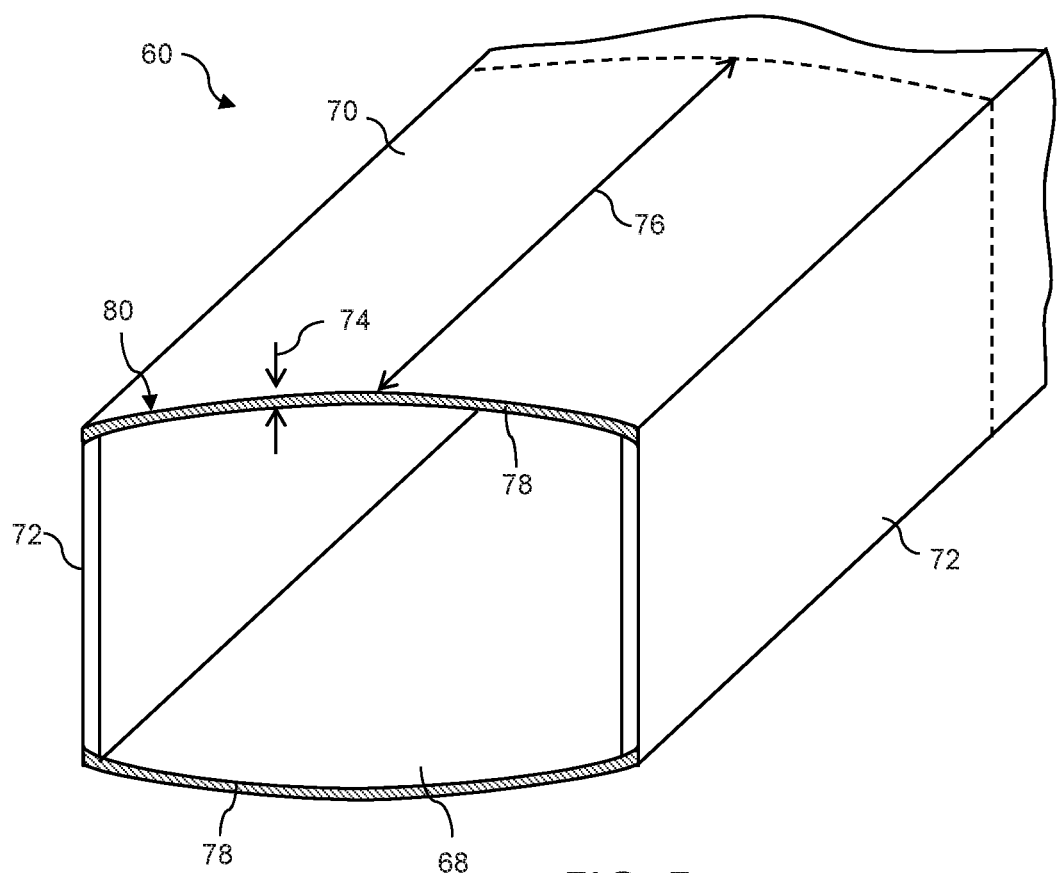
FIG. 5 is a partial perspective view of an embodiment of a receiving section within the second blade segment.

FIG. 5 depicts an embodiment of the receiving section 60 formed by opposite spar caps 68 (suction side), 70 (pressure side) and interconnecting webs 72 (e.g. shear webs) in a box-beam configuration. In this particular embodiment, the spar caps 68, 70 have a constant thickness 74 at least along the length 76 (and across the chord-wise aspect) of the receiving section 60 where the spar caps 68, 70 overlap with the spar caps 46, 48 of beam structure 40. The material (or combination of different materials) and thickness 74 of the spar caps 68, 70 along the length 76 is selected to produce a desired stiffness of the spar caps along the receiving section for ensuring that the pressure and suction side shell components of the blade 28 remain fixed to the internal spar structures 42, 66 of the blade segments 30, 32.

In the embodiment depicted in FIG. 5, the spar caps 68, 70 are formed of single material, which may be a relatively high strength carbon material (e.g., a carbon fiber material) that is also conductive. In an alternate embodiment, the material may be a lesser-strength material (as compared to a carbon material), such as a glass fiber material. With this embodiment, the non-conductive material is provided at the terminal end 80 of the spar caps 68, 70 adjacent the chord-wise joint 34.

Figure 6:
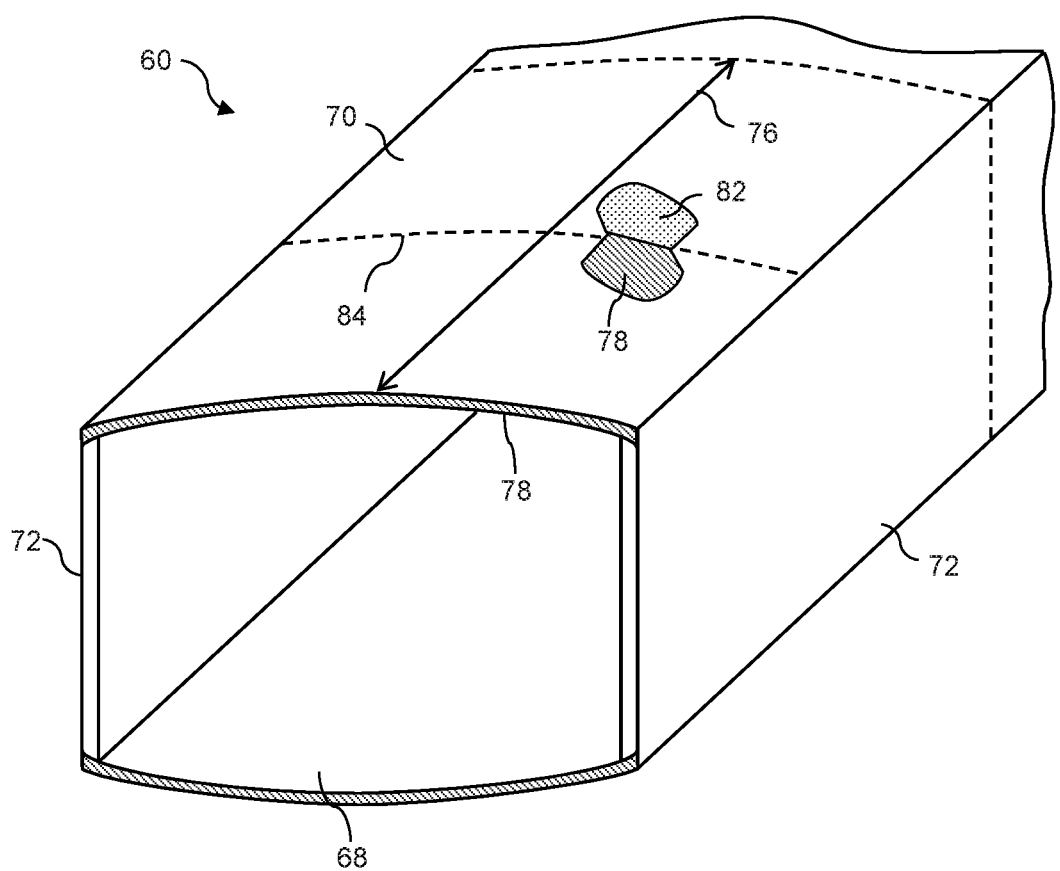
FIG. 6 is a partial perspective view of an alternate embodiment of a receiving section within the second blade segment.
Figure 7:
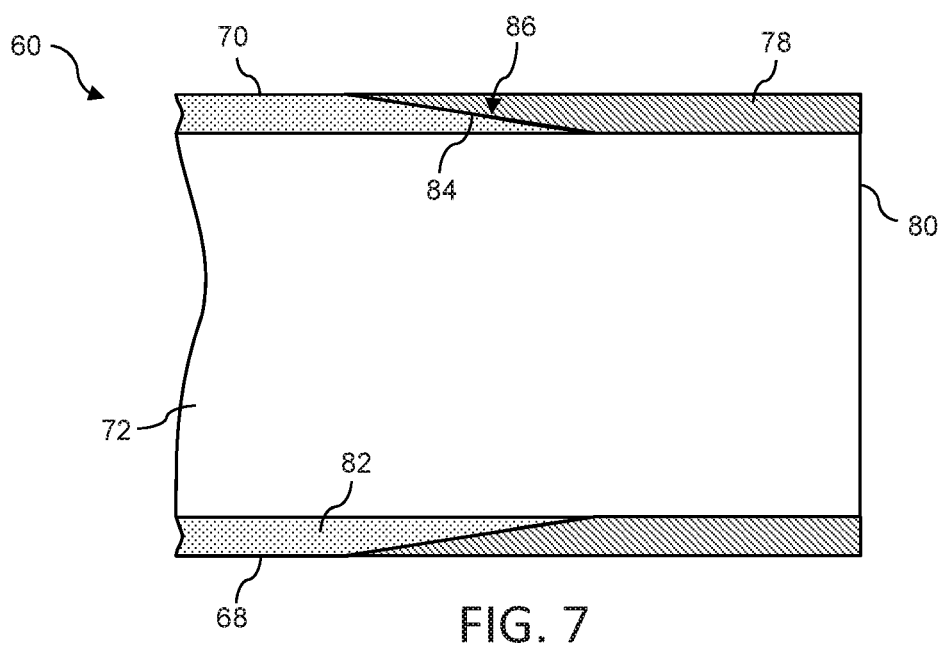
FIG. 7 is a side cut-away view of an embodiment of the receiving section particularly depicting overlapping portions of different materials forming the spar caps.

FIG. 6 depicts an alternate embodiment of the receiving section 60 wherein a section of the spar caps 68, 70 adjacent to the joint line 34 are formed from a first material 78, and a second section of the spar caps 68, 70 extending span-wise along the length 76 thereof are formed from a different material 82. For example, the first material 78 may be a non-conductive glass material (e.g., a glass fiber material) and the second material 82 may be a higher-strength carbon material 82. In this embodiment, the entirety of the constant thickness 74 of the spar caps 68, 70 at the chord-wise joint 34 is defined by the non-conductive material, which extends span-wise away from the chord-wise joint 34 for a defined length. A transition 84 is defined between the different materials 78, 82 that maintains the constant thickness 74 along the receiving section 60. For example, FIG. 7 depicts the transition 84 as an overlapping section 86 of tapered lengths of the carbon material 82 and non-conductive material 78, wherein the overlapping section 86 maintains the overall constant thickness 74 of the spar caps 68, 70.

Figure 8:
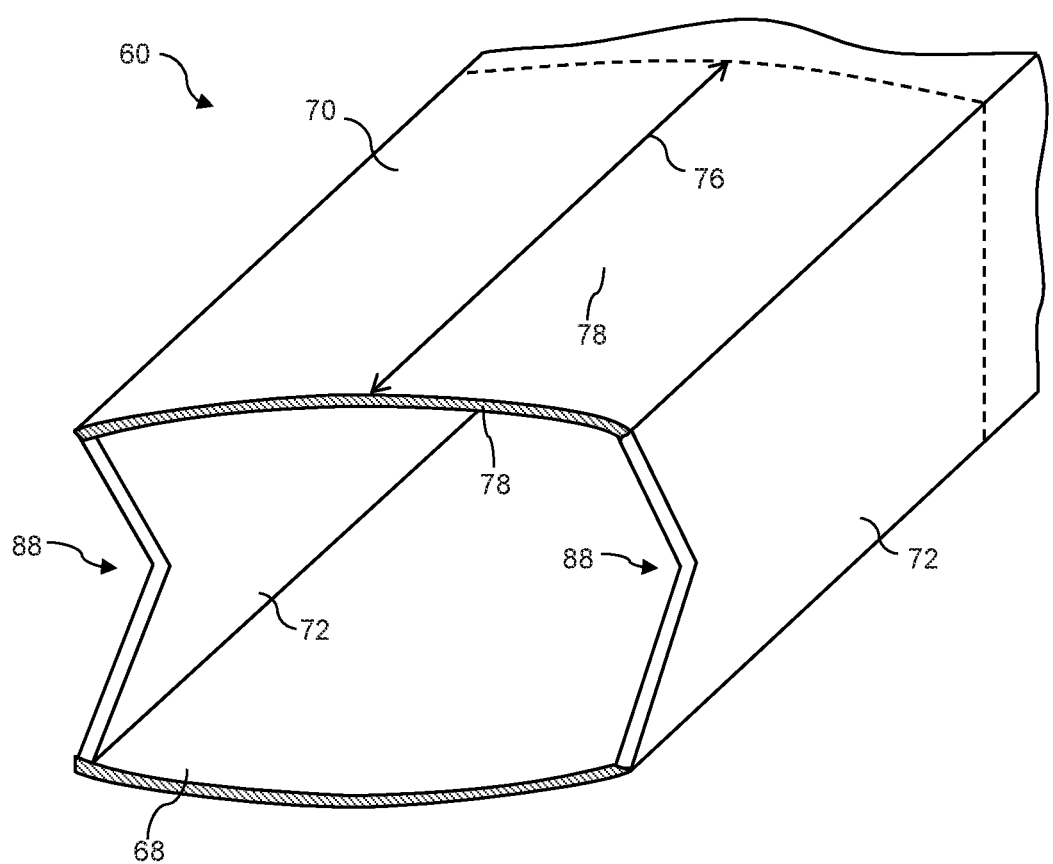
FIG. 8 is a partial perspective view of an alternate embodiment of a receiving section within the second blade segment depicting a cutout in the interconnecting webs at the joint line.
Figure 9:
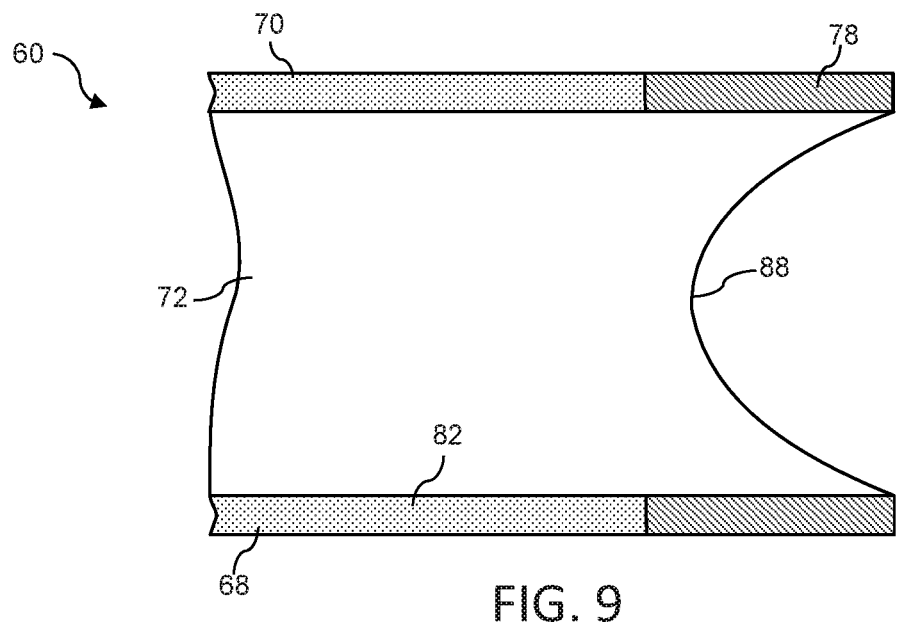
FIG. 9 is a side cut-away view of an embodiment of the receiving section particularly depicting a cutout section of the interconnecting web at the joint line.

In addition, the embodiments of the receiving section 60 described above having spar caps 68, 70 with the constant thickness 74 may include a configuration of the interconnecting webs 72 that minimize the amount of conductive material presented at the joint line 34. For strength considerations, the webs 72 are typically formed from a high-strength carbon fiber material (which is conductive). The unique webs 44 of the present disclosure may be configured with a reduced amount of the carbon material at the chord-wise joint 34 as compared to the amount of carbon material in the webs 44 at a defined distance from the chord-wise joint 34. For example, the interconnecting webs comprise a cutout region 88 adjacent the chord-wise joint line. In FIG. 8, this cutout region 88 is a straight-sided region, such as a triangular cutout region 88. In FIG. 9, the cutout region 88 is depicted as a curved region, such as a semicircular region. It should be appreciated that "cutout region" also encompasses one or more holes in the webs 72 adjacent to the joint 34.

Figure 10:
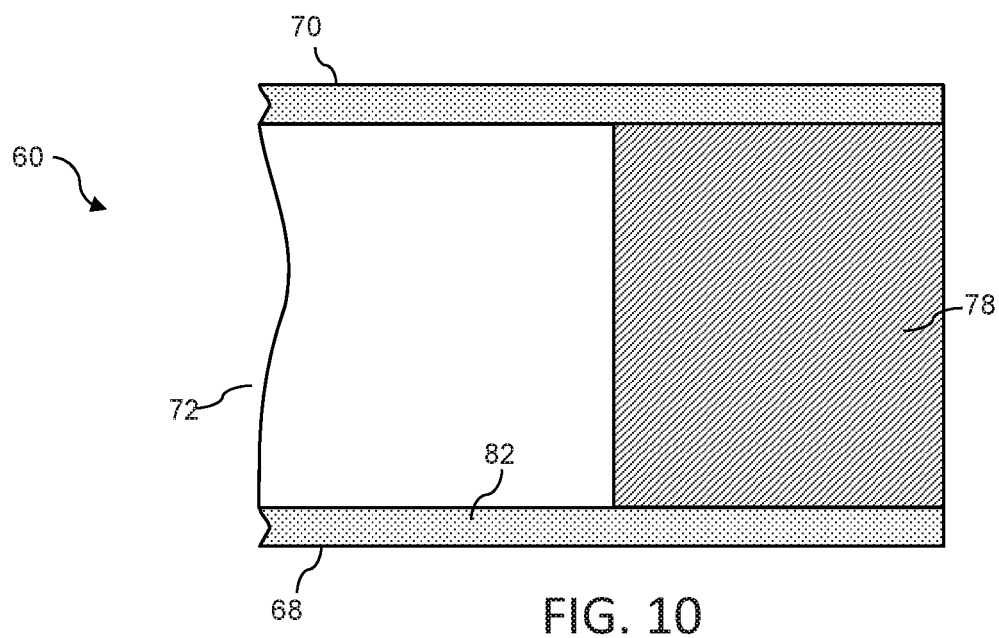
FIG. 10 is a side cut-away view of an embodiment of the receiving section particularly depicting different materials forming the interconnecting webs.

In an alternate embodiment that reduces the amount of conductive material in the webs 72 adjacent to the joint 34 depicted in FIG. 10, the interconnecting webs 72 include a transition from the conductive material 82 to a non-conductive material 78 (such as a glass fiber material) at a distance from the chord-wise joint 34.

Figure 11:
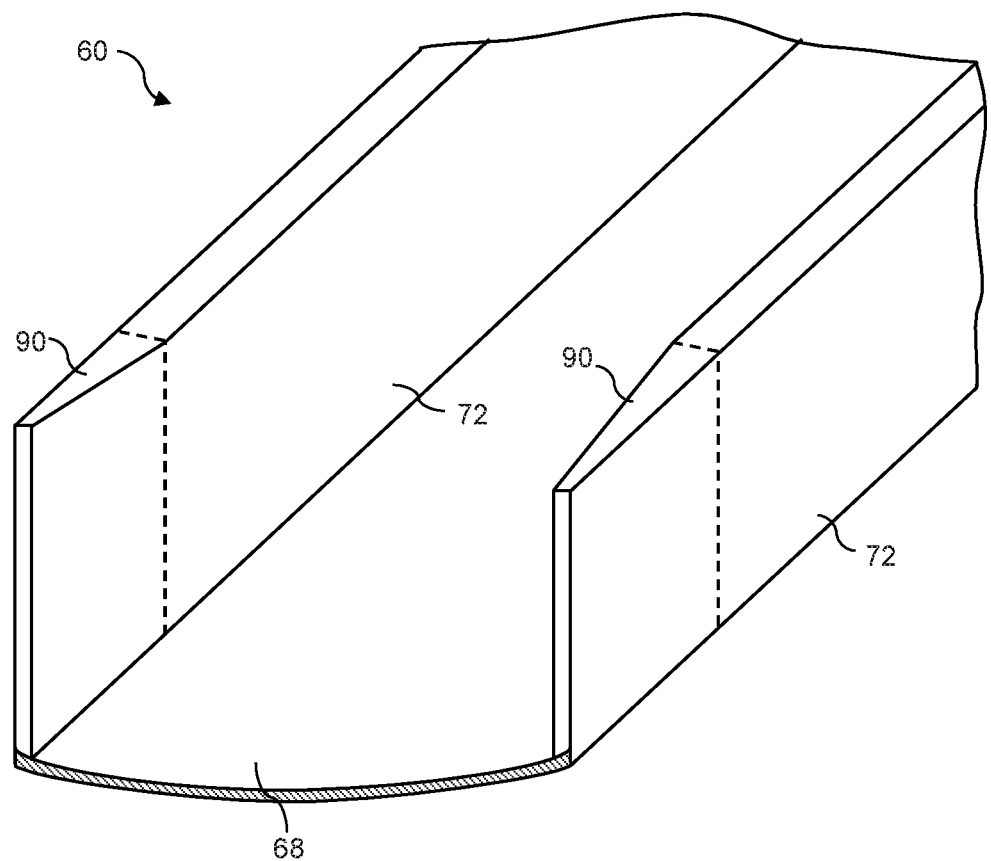
FIG. 11 is a partial perspective view of an embodiment of the receiving section within the second blade segment particularly depicting a tapering aspect of the interconnecting webs towards the joint line.

Referring to FIG. 11, another embodiment that reduces the amount of conductive material in the webs 72 adjacent to the joint 34, includes a tapered section 90 of the webs 72 adjacent to the joint 34, the taper resulting in a reduction in thickness of the webs 72 (and corresponding reduction in material).

The present invention also encompasses embodiments of a wind turbine rotor blade 28 wherein the spar caps 68, 70 in the receiving section 60 are formed with a non-conductive material 78 at the terminal end 80 thereof at the chord-wise joint 34 (referring, for example, to FIG. 9) regardless of whether the spar caps 68, 70 have a constant or non-constant thickness along the length 76 of the receiving section 60. Such an embodiment can include any one or combination of the additional features discussed above, such as the interconnecting webs 72 having a reduced amount of conductive material adjacent the joint 34.

Referring to FIGS. 8 through 11, regardless of the configuration of the spar caps 68, 70, the present invention also encompasses embodiments of a wind turbine rotor blade 28 wherein the interconnecting webs 72 in the receiving section 60 spar structure have a reduced amount of conductive material adjacent the joint 34 as compared to the amount of conductive material at a defined distance from the joint 34. Such an embodiment can include any one or combination of the additional features discussed above, such as the spar cap 68, 70 configurations discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
a first blade segment and a second blade segment extending in opposite directions from a chord-wise joint, each of the blade segments having a pressure side shell member and a suction side shell member;
a beam structure extending span-wise from the first blade segment;
a receiving section formed in the second blade segment for receipt of the beam structure, the receiving section comprising opposite spar caps and opposite interconnecting webs,
wherein the spar caps comprise a constant thickness along the receiving section where the spar caps overlap with the beam structure to produce a desired stiffness of the spar caps along the receiving section, and wherein the interconnecting webs comprise a tapering thickness approaching the chord-wise joint line.

2. The wind turbine rotor blade according to claim 1, wherein the spar caps comprise a non-conductive material at a terminal end thereof at the chord-wise joint.

3. The wind turbine rotor blade according to claim 2, wherein an entirety of the constant thickness of the spar caps at the chord-wise joint is defined by the non-conductive material, wherein the non-conductive material extends span-wise away from the chord-wise joint for a defined length.

4. The wind turbine rotor blade according to claim 2, wherein the spar caps comprise a transition from a different material to the non-conductive material along the receiving section while maintaining the constant thickness along the receiving section.

5. The wind turbine rotor blade according to claim 4, wherein the different material is a carbon material and the transition comprises tapering and overlapping sections of the carbon material and the non-conductive material.

6. The wind turbine rotor blade according to claim 1, wherein the interconnecting webs are formed from a carbon material and comprise a reduced amount of the carbon material at the chord-wise joint line as compared to a defined distance from the chord-wise joint line.

7. The wind turbine rotor blade according to claim 6, wherein the interconnecting webs comprise a cutout region adjacent the chord-wise joint line.

8. The wind turbine rotor blade according to claim 7, wherein the cutout region comprises a curved or semicircular cutout.

9. The wind turbine rotor blade according to claim 6, wherein the interconnecting webs comprise a transition from the carbon material to a non-conductive material at a distance from the chord-wise joint line.

10. A wind turbine rotor blade, comprising:
a first blade segment and a second blade segment extending in opposite directions from a chord-wise joint, each of the blade segments having a pressure side shell member and a suction side shell member;
a beam structure extending span-wise from the first blade segment;

a receiving section formed in the second blade segment for receipt of the beam structure, the receiving section comprising opposite spar caps and opposite interconnecting webs; and wherein the spar caps comprise a non-conductive material at a terminal end thereof at the chord-wise joint, wherein the spar caps comprise a transition from a carbon material to the non-conductive material along the receiving section.

11. The wind turbine rotor blade according to claim 10, wherein an entirety of the spar caps at the chord-wise joint is defined by the non-conductive material, wherein the non-conductive material extends span-wise away from the chord-wise joint for a defined length.

12. The wind turbine rotor blade according to claim 10, wherein the transition comprises tapering overlapping sections of the carbon material and the non-conductive material.

13. The wind turbine rotor blade according to claim 10, wherein the interconnecting webs comprise a reduced amount of carbon material at the chord-wise joint line as compared to a defined distance from the chord-wise joint line.

14. The wind turbine rotor blade according to claim 13, wherein the interconnecting webs comprise a cutout region adjacent the chord-wise joint line.

15. The wind turbine rotor blade according to claim 13, wherein the interconnecting webs comprise a tapering thickness of the carbon material approaching the chord-wise joint line.

16. A wind turbine rotor blade, comprising:
a first blade segment and a second blade segment extending in opposite directions from a chord-wise joint, each of the blade segments having a pressure side shell member and a suction side shell member;
a beam structure extending span-wise from the first blade segment;
a receiving section formed in the second blade segment for receipt of the beam structure, the receiving section comprising opposite spar caps and opposite interconnecting webs; and
wherein the interconnecting webs comprise a reduced amount of carbon material at the chord-wise joint line as compared to a defined distance from the chord-wise joint line,
wherein the interconnecting webs comprise a cutout region adjacent the chord-wise joint line.

17. The wind turbine rotor blade according to claim 16, wherein the interconnecting webs comprise a tapering thickness of the carbon material approaching the chord-wise joint line.

* * * * *